B. HOWARD.
Ambulance.
No. 48,404.
Patented June 27, 1865.
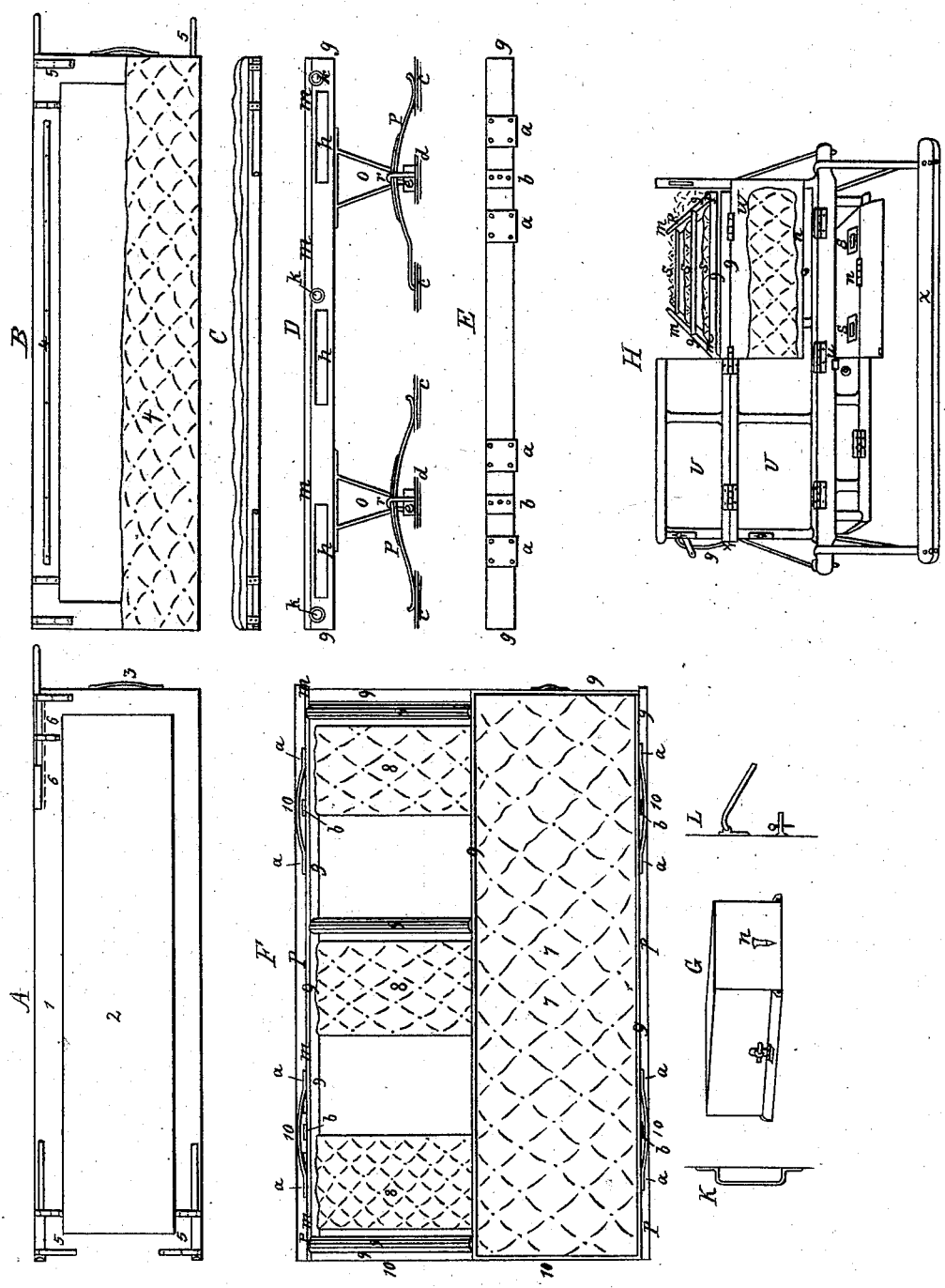
Witnesses:
Inventor:
B. Howard

UNITED STATES PATENT OFFICE.

BENJN. HOWARD, OF NEW YORK, N. Y.

IMPROVEMENT IN AMBULANCES.

Specification forming part of Letters Patent No. 48,404, dated June 27, 1865.

*To all whom it may concern:*

Be it known that I, BENJAMIN HOWARD, of the city and county of New York, and State of New York, have invented a new and useful Improvement on Ambulances; and I do hereby declare that the following is a full, clear, and exact description of the construction and operation of the same, reference being had to the annexed drawings, making a part of this specification, in which—

Figure H is a plane view of the tail-board and a partial perspective view of the interior. Figs. A, B, and C represent the sliding beds or litters; D and E, the external and internal views of the longitudinal part of the frame on which seats and beds rest, with its supports and springs; Fig. F, a plane view of the frame with lateral springs, showing seats in position on one side and the sliding bed in position on the other; Fig. G, a perspective view of water-tank; Figs. K and L, the rack and clasp for holding stretchers fixed on the side of the ambulance.

In the body of an ordinary ambulance or vehicle I place a wooden frame parallel with the floor of the ambulance, occupying its entire length, but its width being less by about two inches than that of the inside of the body of the vehicle, leaving an interspace of about one inch between it and the frame on either side, as represented in Fig. F, 10 being the inner line of the body of the ambulance, $g$ the wooden frame, $p$ the interspace between the frame and the body. The center longitudinal piece has a rabbet on both sides corresponding to the rabbet $m$ in Fig. D. Along these rabbets beds or litters slide on the rollers, Fig. F, 9, clearing the cushions of the transverse seats, Fig. 8.

Fig. D, $h$, shows the bed on the inside of the frame, into which the seats are let, and then closed over, if desired, by a cleat which forms a continuation of the rabbet along which the beds or litters slide; Fig. D, $k$, bed cut out of inside of frame, in which the axis of wooden rollers F, 9, revolve.

The beds or litters are constructed of wood in single panel, of which an under view is seen at Fig. A—1, the stile and rail; 2, the panel; 3, leather handle for convenience in pulling the bed out of the ambulance.

To enable the beds to be carried as a litter more conveniently in transferring wounded, I use iron handles, which, when the litter is in the ambulance, do not project in any way from the plane of the wooden structure of the litter, as seen at 5 5, A, and in Fig. C, but which, when required for use, can be slid out through the jaws of iron clamps, which retain them in position, as seen at A, 6. Fig. B is an upper view of wooden part of bed or litter, half of which is covered by hair-cushion in the drawings, Fig. B. Fig. 4 is an iron bar, attached simply to increase strength of litter, which is made as thin and light as is consistent with necessary strength.

The seats consist of a plain board, covered with cushions, which fit into the beds or rabbets at D, $h$, and are either fastened permanently by a cleat forming a continuation of rabbet along which the litters slide, or, in absence of these, they may remain movable.

The frame on which the litters and seats rest is supported by four iron stanchions of a height most convenient for the sitting passengers, as at Fig. D, or, for the prevention of jarring motion, the stanchions rest on semi-elliptical steel springs, Fig. D, $p$, the ends of which play upon iron plates fixed to the floor of the vehicle, Fig. D, $c$. To prevent the transmission to the litters or seats of any jar communicated to the floor of the vehicle, these semi-elliptical steel springs are prevented from upward motion by a staple, Fig. D, $r$, so that the springs are capable only of a counterpoise motion downward, which, when violent, is received by a block of india-rubber, Fig. D, $e$. A similar semi-elliptical steel spring is also attached to the body of the vehicle, Fig. F, 10, occupying the interspace between the inside of the body of the vehicle and the frame on which the seats and litters rest. The ends of these springs play upon iron plates fastened on the outer side of the frame, as seen at Fig. E, $a$, and Fig. F, $a$. When the lateral motion is very violent the force is received by blocks of india-rubber fastened upon the frame occupying the center of the arc of the lateral spring, as seen at Fig. E, $b$, and Fig. F, $b$. By thus using these counterpoise-springs the jar both from perpendicular and lateral motions is greatly diminished.

When the litters are not in use they are slid into a compartment beneath the floor of the vehicle, Fig. H, $r$, on steel rollers let into the floor of compartment, Fig. H, $s$. Thus, beside the room on the driver's seat, the ambulance provides for (6) six persons seated, or for (3) three persons seated and one lying, or for (2) two lying down.

I have also introduced a new method of fastening a stretcher to the outside of the side of the ambulance. An iron rack, Fig. K, receives the handle of the stretcher at one end of the ambulance, the other end of the handle being received by an iron clasp, Fig. L, at the other, which, by means of graduated holes in the male portion of the clasp and the use of an iron pin, it is made to grasp tightly the various-sized handles, as at Fig. H, 9, preventing motion and rattling during progression of the vehicle.

I have also substituted for the ordinary cask a tank for containing water, which is rendered motionless during progression by its being so adapted to a grooved bed that it can be slid into it and secured by an ordinary fastening. The water-tank is made of wood and lined with zinc, and filled through a hole in the upper surface.

What I claim as my invention, and desire to secure by Letters Patent, is—

The combination of transverse seats and sliding litters or beds resting on a frame placed within the body of the vehicle, supported and balanced by counterpoise-springs within the body of the vehicle, together with the compartment for the beds beneath the main floor of the body of the vehicle, in which the litters or beds may be placed for convenience when not in use, as in the manner described above.

BENJAMIN HOWARD.

Witnesses:
CHARLES W. SY,
ROMEYN SMITH.